United States Patent

Ogawa et al.

[11] Patent Number: 5,854,462
[45] Date of Patent: Dec. 29, 1998

[54] STAINLESS-STEEL FLUX CORED WIRE ELECTRODE

[75] Inventors: Tsuneshi Ogawa; Teru Haginoya; Toshiharu Maruyama; Shigeki Nishiyama; Shintaro Ozaki, all of Fujisawa, Japan

[73] Assignee: Kabushiki Kaisha Kobe Seiko Sho, Kobe, Japan

[21] Appl. No.: 828,383

[22] Filed: Mar. 28, 1997

[30] Foreign Application Priority Data

Mar. 29, 1996 [JP] Japan ..................................... 8-077599

[51] Int. Cl.⁶ ..................................................... B23K 9/24
[52] U.S. Cl. ............................. 219/137 WM; 219/130.01; 219/145.22
[58] Field of Search .......................... 219/145.22, 130.01, 219/146.23, 137 WM, 137 R

[56] References Cited

U.S. PATENT DOCUMENTS

| | | | |
|---|---|---|---|
| 4,005,309 | 1/1977 | Zvanut et al. ........................ | 219/145.22 |
| 5,124,529 | 6/1992 | Nishikawa et al. . | |
| 5,219,425 | 6/1993 | Nishikawa et al. . | |
| 5,378,871 | 1/1995 | Nishikaw et al. . | |

*Primary Examiner*—Clifford C. Shaw
*Attorney, Agent, or Firm*—Oblon, Spivak, McClelland, Maier & Neustadt, P.C.

[57] ABSTRACT

Provided is a stainless-steel flux cored wire electrode with excellent arc stability and good workability with less sputter generation, which can attain the overall sputter reduction and arc stability and can further prevent instantaneous arc disorders and sputter generation at a higher level to form a high-quality weld metal. A stainless-steel flux cored wire electrode comprising a flux filled in the stainless-steel housing at 10 to 30% to the total weight of the wire electrode, wherein the wire electrode temperature is measured and recorded on the recording chart of a temperature recorder, which chart is scaled in such a manner that the 100° C. corresponds to 5 cm and the 100 mm wire electrode length corresponds to 1 cm, by passing electricity through appropriate two points, apart 300 mm to 1,000 mm from each other, in the wire electrode in the longitudinal direction, to electrically heat the wire electrode to 500° to 1,000° C., and wherein the ratio (K value=L1/L0) of the length (L1) of a temperature-distribution curve on the recording chart to the base line length (L0) corresponding to the measured wire electrode length is 2.5 or less, preferably 1.5 or less.

4 Claims, 5 Drawing Sheets

F I G. 3
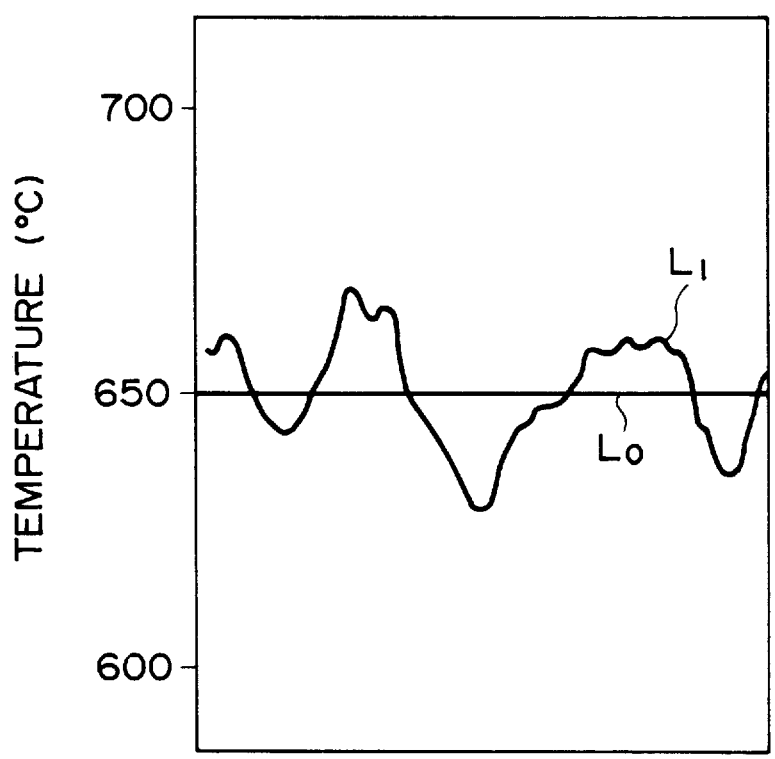

BEAD-ON PLATE METHOD

FILLET TEST

F I G. 5
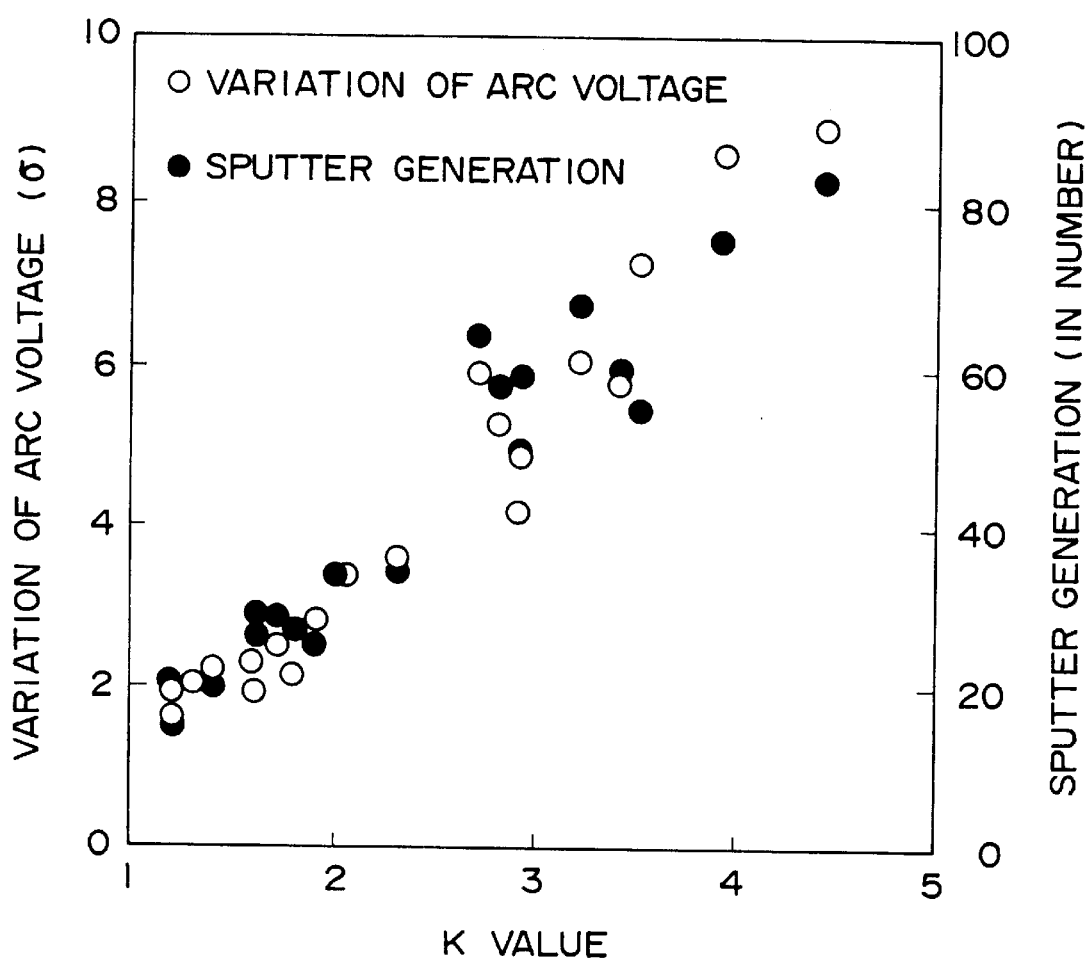

STAINLESS-STEEL FLUX CORED WIRE ELECTRODE

BACKGROUND OF THE INVENTION

The present invention relates to a stainless-steel flux cored wire electrode, with great workability with good arc stability and less sputter generation.

Because stainless steel has great corrosion resistance and heat resistance and because austenite stainless steel in particular has improved low-temperature toughness and high-temperature strength, these stainless-steels have been used commonly in various structures such as chemical units, paper making systems, petroleum refining systems and chemical tanks. For welding these structures, use may be made of a variety of welding processes such as shielded arc welding, TIG welding and a welding process by means of flux cored wire electrode or submerge arc welding. Among them, the welding process by means of flux cored wire electrode can be carried out at a higher efficiency and the process is readily automated, because the process does not require skilled welding art. Therefore, the process is now a major welding process in place of shielded arc welding.

Flux cored wire electrode comprises an appropriate amount of a flux comprising a metal component, oxide and fluoride and the like, being filled in the stainless-steel outer housing. As the shield gas during welding, frequently, use may be made of 100% $CO_2$ or Ar with (20 to 25%) $CO_2$. Furthermore in recent years, significant attention has been focused on the workability of weld metals in addition to the performance thereof. Particularly because poor arc stability or greater sputter generation causes weld defects such as poor fusion or insufficient weld penetration or the sputter deposited on the surface of structures may readily work as an initiation point of corrosion, the development of a wire electrode with great arc stability and high workability with less sputter generation has been desired strongly.

As is disclosed in Japanese Patent Laid-open Nos. Sho 62-006797and Sho 62-068696, the improvement of the workability has been designed from the respect of the components of a filled flux and wire electrode supply.

Although these processes can reduce the overall generation of sputter, the processes cannot prevent instantaneous arc disorders frequently occurring during welding or subsequent sputter generation at a higher level. More specifically, sputter reduction cannot be achieved until arc stability is overall improved together with the improvement of instantaneous arc disorders, whereby a high-quality weld metal can be prepared. By conventional processes, such instantaneous arc disorders, involving sputter generation at a higher level, have not been prevented.

In order to overcome such problems, the present invention has been achieved. It is an object of the present invention to provide a stainless-steel flux cored wire electrode, capable of reducing overall sputter and procuring arc stability and additionally capable of preventing instantaneous arc disorders involving sputter generation, to form a high-quality weld metal.

SUMMARY OF THE INVENTION

The flux cored wire electrode of the present invention comprises a flux filled in the stainless-steel housing at a ratio of 10 to 30% to the total weight of the wire electrode. By passing electricity through appropriate two points, apart 300 mm to 1,000 mm from each other, in the longitudinal direction of the wire electrode, the wire electrode is electrically heated to 500° to 1,000° C. The wire electrode temperature then is measured and recorded on a chart of a temperature recorder scaled in such a manner that the 5-cm length corresponds to 100° C. and the 1-cm length corresponds to the 100-mm wire electrode length. The ratio (K=L1/L2) of the length (L1) of the temperature-distribution curve on the chart to the length (L0) of the base line corresponding to the wire electrode length measured should be 2.5 or less. Preferably, the K value should be 1.5 or less.

The K value is determined specifically as follows. As described above, FIG. 3 depicts one temperature pattern recorded on a chart scaled as described above. The example represents a weld wire electrode heated at 650° C., wherein the temperature-distribution curve on the chart shows vertical vibration above and below 650° C. and the length L1 of the temperature-distribution curve on the chart is the length along the locus of the vibrating curve. As shown in broad line in the figure, alternatively, the length L0 of the base line corresponding to the wire electrode length measured is the length of the temperature-distribution curve measured and recorded on the chart in the longitudinal direction of the wire electrode.

The present inventors have made investigations so as to examine the disorders of the arc stability and sputter generation in flux cored wire electrodes. The wire electrode top and melted pool of a flux cored wire electrode is examined, during welding, under observation through a high-speed video system, which showed that when globules formed on the wire electrode top are transferred to a melting pool, globules with a smaller variation of the dimension are smoothly transferred into the melting pool with relatively less sputter generation. However, the position of generating arc from globules suspended on the wire top gets more unstable as the dimension of globules is at a larger variation, bringing about readily a more disordered arc state. Then, the inventors have found that such globules per se are splashed as sputter during the transfer thereof into a melting pool or the melting pool severely vibrates just when the globules are transferred into the pool to readily cause sputter generation in the melting pool. It has been observed that globules with a smaller size are likely to have more stable arc stability.

Even wire electrodes produced from the same materials by the same manner individually show different globules transferability frequently, and some wire electrode shows significantly different arc stability in the longitudinal direction of the wire electrode. Focusing their attention to the wire electrode homogeneity, the present inventors have made investigations about the correlation thereof with arc stability.

Preparing 308-series flux cored wire electrodes with various degrees of homogeneity in the longitudinal direction (and with a diameter of 1.2 mm), the arc stability, namely the relation with the variation in globules transfer time and the K value, is examined. FIG. 1 are graphs depicting the relation between the variation of the globules transfer time and the K value. As shown in FIG. 1, the variation of the globules transfer time has an apparent correlation with the wire electrode homogeneity represented by the K value. It has been found that a K value of 2.5 or less brings about outstanding arc stability. As shown in examples described below, furthermore, the sputter generation varies, depending on the change of arc stability. Therefore, the improvement of arc stability can reduce sputter.

The reason why the numerical figures are specified with limitation in the claims of the present invention will be described below.

① Flux ratio (%); 10 to 30%

The flux ratio less than 10% severely limits the alloy components needed to form a weld metal corresponding to each steel type and the addition of a slug generating agent to maintain good workability; additionally, such flux ratio decreases the deposition rate so that high deposition as a great advantage of flux cored wire electrodes cannot be brought about. A flux ratio above 30% alternatively involves difficulty in stable flux filling or causes severe elongation during wire electrode production process, with the resultant occurrence of wire electrode break or the increase of the number of annealing required, disadvantageously from the respect of productivity. Herein, the flux ratio is represented in % by weight.

② Electrically heating temperature; 500° C. to 1,000° C.

Because the electrically heating temperature at less than 500° C. is too low, the wire electrode homogeneity cannot sufficiently be evaluated. The temperature above 1,000° C. is not essentially required. The wire electrode homogeneity can be satisfactorily evaluated by heating up to 1,000° C. Furthermore, heating up to and above 1,000° C. involves a risk to burn through a wire electrode; so as to avoid such burn-through, in such case, a costly heating system with a function to precisely control the temperature should be used inevitably, which is not practical.

③ Distance of electrically heating interval (Distance of electrically heated points); 300 mm to 1,000 mm The distance of electrically heated points below 300 mm cannot develop the difference in temperature, so no satisfactory assessment of the wire electrode homogeneity can be attained. The distance of electrically heated points above 1,000 mm may eventually develop a temperature difference due to factors other than the essential wire electrode homogeneity, such as the generation of oxide film, so that appropriate assessment sometimes cannot be attained then.

The temperature distribution in wire electrodes is readily influenced by the electrically heating conditions and the duration. More specifically, if a wire electrode is heated up to a given temperature over a long period or if a wire electrode is maintained even after the wire electrode reaches the given temperature, all such wire electrodes get a uniform temperature distribution, irrespective to the presence of the homogeneity of the individual wire electrodes. Therefore, such wire electrode is not suitable for the purpose of the present invention.

The electrically heating time appropriate for evaluating the wire electrode homogeneity varies depending on the heating temperature, heating process and wire electrode diameter, so the time is not generally defined. As shown in the chart of FIG. 3 depicting the temperature-distribution curve of a wire electrode heated up to 650° C. in the subjective range of 500 mm, the temperature of wire electrode reached a given value in about 5 seconds after the initiation of heating. Subsequently, the temperature distribution of the wire electrode is measured and recorded within about 3 seconds. In such manner, preferably, the time required for heating the wire electrode to a given temperature and the time required for measuring the temperature distribution are individually set within several seconds. Excessively long time should be avoided.

④ Scaling of recording chart of temperature recorder in such a manner that 5 cm corresponds to 100° C. and 1 cm corresponds to the wire electrode length of 100 mm K Value can be determined on the temperature-distribution curve recording the wire electrode temperature. If the scale of a recording chart changes per unit temperature and unit wire electrode length, in this case, the shape of the temperature-distribution curve of even the same wire electrode varies, leading to difference in the K value. More specifically, the wire electrode homogeneity can be objectively assessed, only if a recording chart therefor is constantly scaled. From such respect, the assessment is made of the correlation between the scaling of the recording chart and the workability. Consequently, good correlation is recovered between the K value and the workability, when the 5-cm length corresponded to 100° C. and the 1-cm length corresponded to the 100-mm wire electrode length.

⑤ K Value; 2.5 or less

As has been described above, the variation of globules transfer time, the sputter generation and the variation of arc voltage are less at a K value of 2.5 or less. On the contrary, the variation of the globules transfer time is larger with greater sputter generation at a K value above 2.5.

Wholly or partially, conventional wire electrodes have K values above 2.5. Therefore, welding with such wire electrodes causes unstable arc; in some cases, the length of the wire electrodes in projection varies as if the wire electrode supply are deteriorated, so that arc orientation is deteriorated to cause eventually weld defects.

The reason why the K value is used as a means for assessing the wire electrode homogeneity resides in that as the consequence of further investigations of wire electrodes of various homogeneity, it has been found that the homogeneity is influenced by the thickness of the housing constituting the wire electrode and the state of a flux filled therein and that the change in these influencing factors causes difference in the temperature elevation of the wire electrode under heating.

For example, heating a wire electrode with the variation in the housing thickness in the longitudinal direction, a part thereof with a larger housing thickness requires a long time to increase the temperature to a given temperature than a part thereof with a smaller housing thickness. Consequently, the wire electrode temperature varies after a given period passes after the initiation of heating. As the increase in the number of parts non-uniform in terms of housing thickness and flux-filled state, in this case, a great number of parts at different temperatures develop in the same wire electrode; the temperature-distribution curve then turns into a shape with much mountainous parts and valleys, and the length thereof is longer than that of a homogenous wire electrode. More specifically, the wire electrode homogeneity can be assessed on the basis of the K value determined from the length of the temperature-distribution curve; if the value is 2.5 or less, better workability can be procured, whereby disadvantages such as sputter generation of higher levels and arc instability can be avoided during actual welding.

A variety of means may be used for setting the K value below 2.5, and are therefore not defined generally. However, the means are broadly grouped by materials and processes of producing wire electrodes. In terms of processes, preferably, flux should be uniformly filled in the housing during molding process, and as such flux, preferably, highly fluid fluxes should be used. At wire electrode elongation process, importantly, dice schedule should be adjusted appropriately to uniformly retain the state of the wire electrode surface. An enforced strengthening process may significantly deteriorate the roundness of the wire electrode and additionally develop roughness on the wire electrode surface, with poor wire electrode homogeneity. The wire electrode homogeneity is significantly influenced by molding process and wire electrode elongation process. Nevertheless, wire electrode should be heated uniformly during annealing. If the wire electrode temperature varies, the elongation of the wire electrode due to heating partially differs, involving the variation in the wire electrode diameter to deteriorate the wire electrode homogeneity.

A wire electrode with good workability can be produced by setting the K value at 2.5 or less; as shown in FIGS. 1 and 5, the workability can be improved by suppressing the K value at 1.5 or less. FIG. 5 is a graph showing the relation of the K value, the variation of arc voltage and sputter generation. As shown in these FIGS. 1 and 5, the suppression of the K value below 1.5 extremely reduces the variation of the globules transfer time and significantly decreases the variation of arc voltage and sputter generation.

BRIEF DESCRIPTION OF THE DRAWINGS

FIG. 3 is a schematic view of a temperature pattern recorded on a recording chart;

FIG. 5 is a graph depicting the relation of the variation of arc voltage, sputter generation and K value.

Description of Preferred Embodiments

Examples are described below in comparison with comparative examples. By the use of combinations of filling fluxes shown in Table 1 and stainless-steel housings shown in Table 2, various wire electrodes with different K values are produced according to JIS Z 3323 YF308L, YF309L, and YF316L.

TABLE 1

| Flux group | Flux composition (% by weight) | | | | | |
|---|---|---|---|---|---|---|
| | $TiO_2$ | $SiO_2$ | $ZrO_2$ | Metal fluoride | Metal powder | Others |
| F1 | 6.2 | 14.4 | 7.2 | 0.5 | 64.2 | 7.5 |
| F2 | 13.4 | 9.2 | 4.6 | 0.3 | 68.4 | 4.1 |
| F3 | 15.6 | 6.0 | 3.7 | 1.2 | 72.4 | 1.1 |

TABLE 2

| Housing group | Chemical components (% by weight) | | | | | | | |
|---|---|---|---|---|---|---|---|---|
| | C | Si | Mn | P | S | Ni | Cr | N |
| H1 | 0.013 | 0.31 | 1.15 | 0.020 | 0.010 | 9.89 | 19.01 | 0.012 |
| H2 | 0.010 | 0.32 | 0.86 | 0.022 | 0.005 | — | 17.76 | 0.015 |

Mental powder in Table 1 was adjusted to contain the suitable amount of alloy elements such as nickel, chromium, molybdenum, manganese etc. for each wire by changing the proportion of metal sources, which were metallic powder and ferrous alloy powder.

The manufacturing process was basically the same for the inventive examples and the comparative ones. Flux was filled in the stainless steel sheath during forming process, after it the wire was elongated and annealed.

The manufacturing conditions are shown in Table 3. The condition of each process was different between the inventive examples and the comparative ones. After the forming process, wire diameters were between 2.5 mm and 2.9 mm.

TABLE 3

| | Manufacturing Conditions | | | | | |
|---|---|---|---|---|---|---|
| | Forming a) | | Elongating b) | | Annealing | |
| | Number of Roll | Velocity m/min | Number of Dice Block | Velocity m/min | Temperature °C. | Velocity m/min |
| Inventive Examples | 4~6 | 65~85 | 3~4 | 95~136 | 620~700 | 200~270 |
| Comparative Examples | 2~3 | 40~60 | 2 | 50~85 | 700~830 | 300~420 | a) Number of Roll after flux is filled in the sheath.
b) Number of Dice Block until wire is elongated to 1.8 mm.

Figure 1:
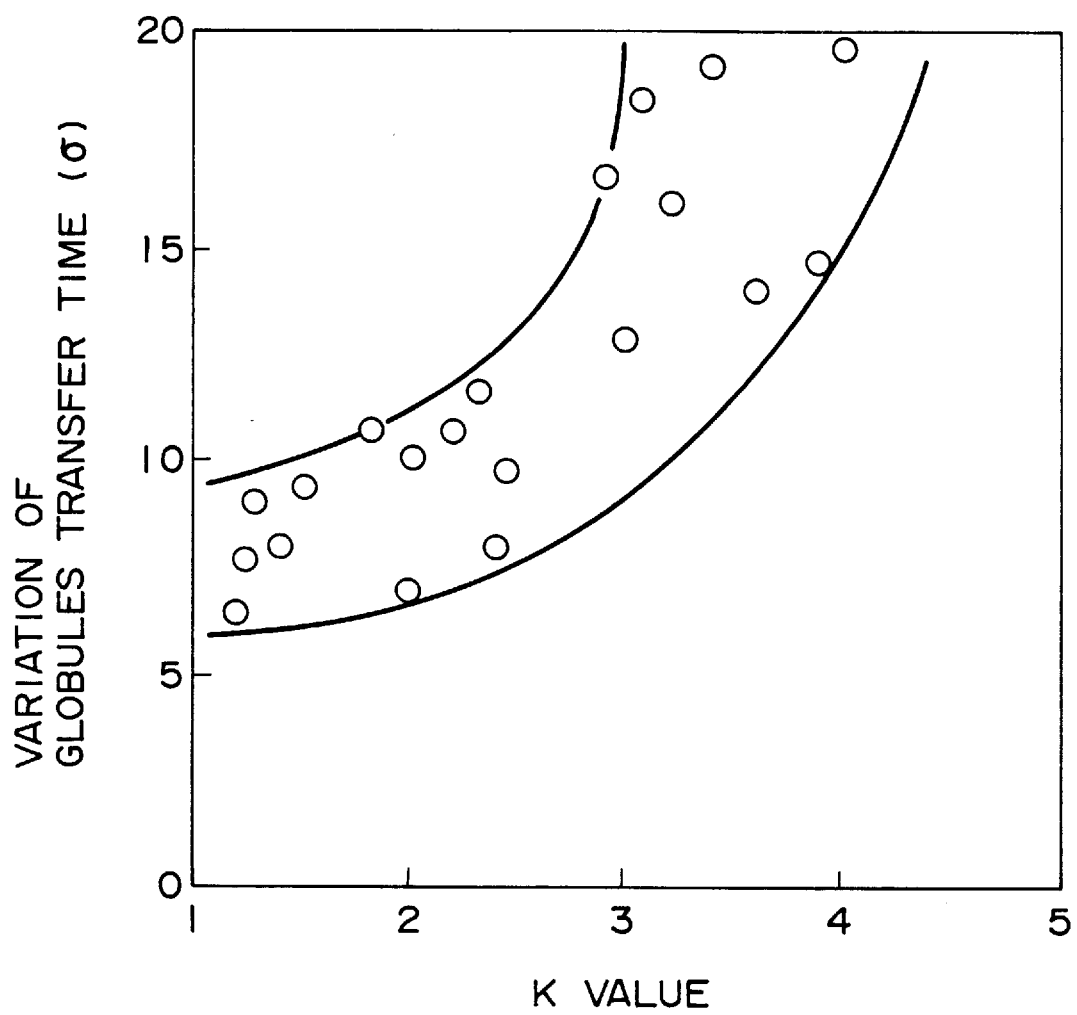
FIG. 1 is graphs depicting the relation between the variation ($\sigma$) of globules transfer time and the K value.
Figure 2:
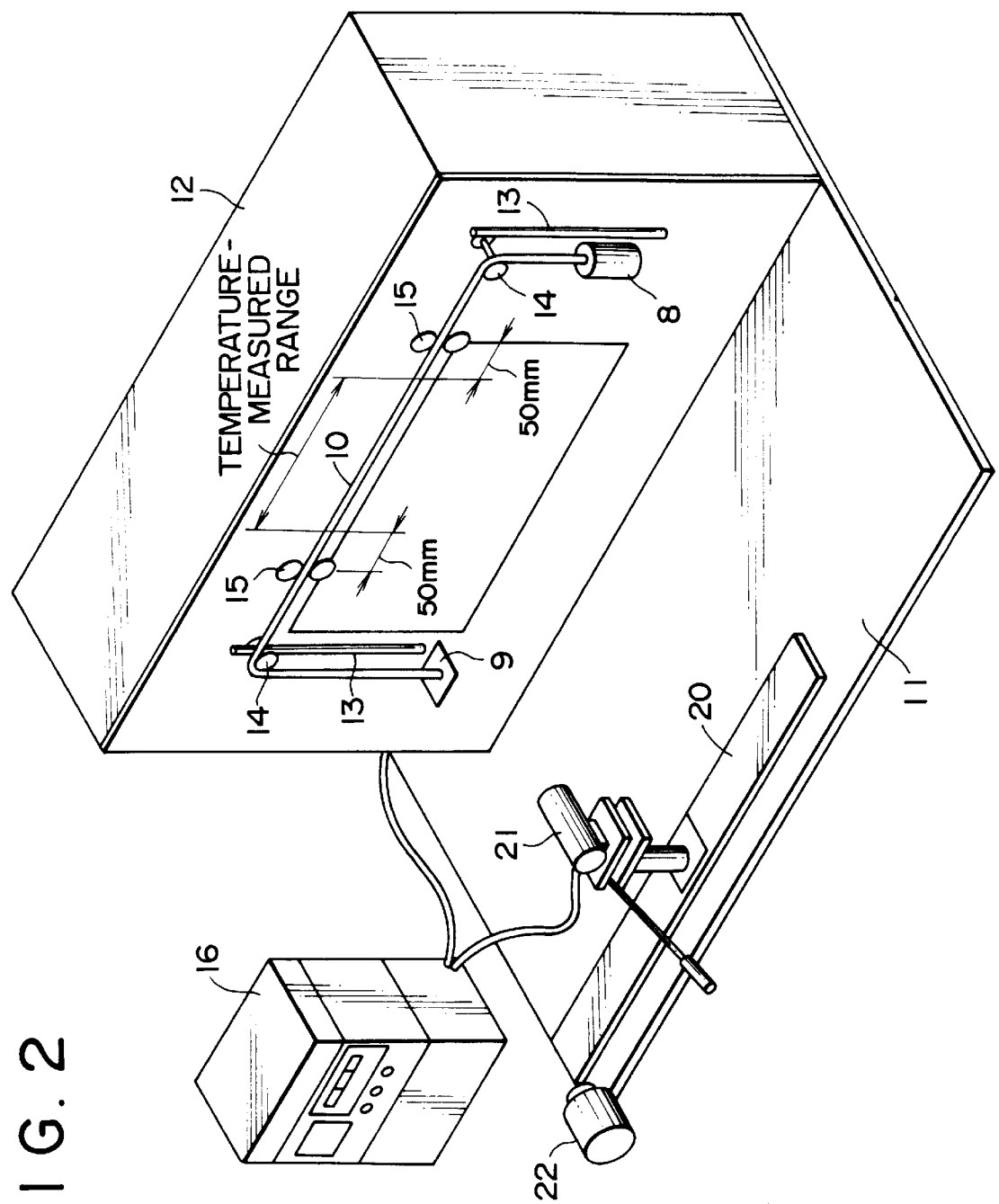
FIG. 2 is a schematic view of an electrically heating tester.

Then electrically heating test and workability assessment test are carried out on the individual wire electrodes. FIG. 2 depicts an electrically heating system used, wherein frame plate 11 mounts supporting plate 12, with two supporting rods 13, 13 fixed on the vertical front face. Reel 14 is mounted in a freely rotational manner on the top of the individual supporting rods 13.

One end of testing wire electrode 10 is fixed on fixing part 9, while dead weight 8 is mounted through reel 14 on the other end at its elongated state. Electricity supply part 15 comprising a copper roller be in contact to the wire electrode 10. From electric power source 16, direct current is fed into the electricity supply part to electrically heat the testing wire electrode 10 to heat the testing wire electrode 10 to a predetermined temperature (500° to 1,000° C.).

The temperature of the wire electrode is measured as follows. Arranging infrared thermometer 21 on constant-velocity transfer table 20 arranged parallel to the wire electrode 10 on the frame plate 11, transferring the infrared thermometer 21 at a constant velocity along the constant-velocity transfer plate 20 by means of motor 22, and scanning the wire electrode in the longitudinal direction, the wire electrode temperature is measured by means of the infrared thermometer 21. The range of the wire electrode measured corresponded to the 500-mm horizontal part of the wire electrode. The results of the measurement are recorded on a chart by means of a recorder in the electric power source 16.

After completion of the temperature measurement, the length (L1) of the temperature-distribution curve on the chart is determined by an image analysis system to calculate the ratio thereof to the base line length (L0) on the chart (K value=L1/L0). L0 corresponds to the length of the temperature-distribution curve of a totally uniform wire electrode.

Arc stability is assessed through the variation of arc voltage during welding by the bead-on plate method. The tendency of sputter generation is evaluated by counting the number of sputter generated during fillet weld.

Figure 4A:
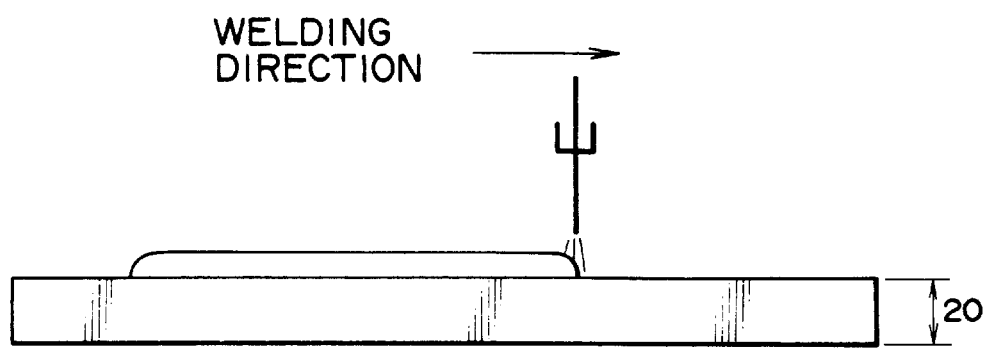
FIGS. 4A and 4B are is a views of the welding state.
Figure 4B:
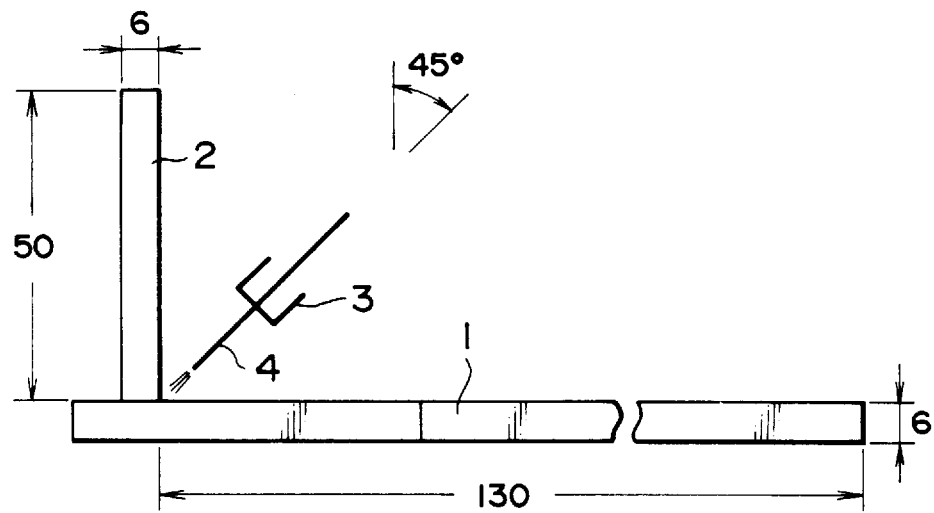

FIG. 4 is a schematic view depicting individual welding states. By the bead-on plate welding, one bead is welded on an SUS 304 test board (20-mm thickness×150-mm width× 300-mm length). The sampling time is 3.2 seconds. At the fillet test, SUS 304 test board 2 (6-mm thickness×50-mm width×370-mm length) is used in combination in a T form, while sputter collecting board 1 (6-mm thickness×90-mm width×600-mm length) is set parallel to and on the side of the bottom plate of the test board so as to sufficiently collect sputter. The angle of welding torch 3 then is 45°, while the targeting position of the wire electrode 4 is set to the route part. After termination of welding, the number of all the sputters deposited on the test boards and sputter collecting board is counted to calculate the number of all the sputters generated. The welding conditions are as shown in Table 4.

TABLE 4

| Wire electrode diameter (mm) | Polarity of electric power source | Electric current A | Voltage V | Velocity (cm/min) | Shield gas and flow | Length (mm) of wire electrode protrusion |
|---|---|---|---|---|---|---|
| 0.9 | DCEP | 120 | 24 | 25 |  | 13 |
| 1.2 | DCEP | 200 | 29 | 30 | 100% $CO_2$ | 17 |
| 1.6 | DCEP | 250 | 31 | 35 | 25 1/min | 20 | geneous materials. In Comparative Examples 15, 16, 17 and 20, the dice schedule is not appropriate during elongation process, so that variation is induced in the processing extent to change the housing thickness.

ADVANTAGES OF THE INVENTION

As has been described above in detail, in accordance with the present invention, even wire electrodes from the same material have different arc stability and sputter generation if the K values change. By setting the K value to 2.5 or less, therefore, a stainless-steel flux cored wire electrode with excellent arc stability and good workability with less sputter generation can be produced. More specifically, in accordance with the present invention, the overall sputter reduction and arc stability can be attained, firstly; additionally, instantaneous arc disorders and sputter generation at a higher level can be prevented to form a high-quality weld metal. Consequently, the occurrence of weld defects can be

TABLE 5

| Group | Housing | Flux | Flux filling rate (%) | Wire electrode type | Wire electrode diameter (mm $\phi$) | K value | Variation of arc voltage (V) | Sputter generation (number) |
|---|---|---|---|---|---|---|---|---|
| Inventive Examples | | | | | | | | |
| 1 | H1 | F1 | 22 | YF308L | 1.2 | 1.4 | 2.2 | 20 |
| 2 | H1 | F1 | 24 | YF309L | 1.2 | 1.9 | 2.8 | 25 |
| 3 | H1 | F2 | 19 | YF308L | 1.6 | 1.8 | 2.2 | 27 |
| 4 | H1 | F2 | 23 | YF316L | 1.2 | 2.3 | 3.6 | 35 |
| 5 | H2 | F3 | 26.5 | YF308L | 1.6 | 1.6 | 2.4 | 26 |
| 6 | H1 | F1 | 23.5 | YF316L | 1.2 | 1.2 | 1.6 | 20 |
| 7 | H1 | F1 | 24 | YF308L | 1.6 | 1.3 | 2.0 | 20 |
| 8 | H2 | F3 | 25 | YF308L | 1.2 | 2.0 | 3.4 | 34 |
| 9 | H1 | F2 | 21 | YF308L | 1.6 | 1.7 | 2.5 | 28 |
| 10 | H1 | F2 | 23 | YF309L | 0.9 | 1.2 | 1.9 | 15 |
| 11 | H1 | F3 | 24 | YF308L | 0.9 | 1.6 | 2.3 | 23 |
| 12 | H2 | F3 | 26 | YF316L | 1.6 | 1.6 | 1.9 | 29 |
| Comp. Examples | | | | | | | | |
| 13 | H1 | F1 | 23.5 | YF316L | 1.2 | 3.2 | 6.1 | 68 |
| 14 | H1 | F1 | 24 | YF308L | 1.6 | 3.5 | 7.3 | 55 |
| 15 | H1 | F1 | 24 | YF309L | 1.2 | 2.8 | 5.3 | 58 |
| 16 | H1 | F2 | 22 | YF308L | 1.2 | 2.9 | 4.2 | 50 |
| 17 | H2 | F3 | 26 | YF308L | 1.6 | 2.9 | 4.9 | 59 |
| 18 | H1 | F2 | 24 | YF316L | 1.6 | 3.9 | 8.6 | 76 |
| 19 | H1 | F2 | 20 | YF309L | 1.6 | 4.4 | 8.9 | 83 |
| 20 | H1 | F1 | 24 | YF308L | 0.9 | 2.7 | 5.9 | 64 |
| 21 | H1 | F1 | 23 | YF316L | 0.9 | 3.4 | 5.8 | 60 |

The results are shown in Table 5 and FIG. 5. Examples 1 to 12 are examples of the present invention, wherein the variation of the arc voltage is less than 4 V at a K value of 2.5 or less. Therefore, the Examples show excellent arc stability and good workability with a number of sputter generation as small as less than 40.

Because the K values of Comparative Examples 13 and 21 are 2.8 and 4.4, larger than 2.5, the variation of arc voltage is large with greater sputter generation. The reason lies in that the fluxes are not uniform in Comparative Examples 13, 14, 18, 19 and 21 during molding, involving the occurrence of scarce and dense presence of fluxes. In Comparative Examples 19 and 21, fine protrusions and recesses are developed on the surface of wire electrodes, because the roll shape is not stable therein. Consequently, the reduction in the diameters of the two wire electrodes or partial transfer of the fluxes during elongation process may presumably work to prepare the wire electrodes into heteroprevented during welding of actual structures, thereby preventing sputter generation to consequently produce a high-quality weld metal.

What is claimed as new and desired to be secured by Letters Patent of the United States is:

1. A process, comprising welding with a flux cored wire electrode, wherein the electrode comprises a stainless steel housing and 10–30% by total weight of the wire of a flux in said housing, the electrode has a K value of at most 2.5, and the K value is measured by a process comprising:

passing electricity in a longitudinal direction through a first point and a second point in the electrode to heat the electrode to 500° to 1000° C., wherein the first point and second point are separated by 300 to 1000 mm; and recording at least one temperature of the electrode between the first and second point on a chart recorder to produce a temperature distribution curve, wherein the recorder is scaled such that 100° C. corresponds to a 5 cm vertical distance and a 100 mm electrode length corresponds to a horizontal distance of 1 cm, and the K value is a ratio of a length of the temperature distribution curve to a length of a baseline.

2. A method of testing a flux cored wire electrode, comprising:

passing electricity in a longitudinal direction through a first point and a second point in the electrode to heat the electrode to 500° to 1000° C., wherein the first point and second point are separated by 300 to 1000 mm; and recording at least one temperature of the electrode between the first and second point on a chart recorder to produce a temperature distribution curve and determine a K value, wherein the recorder is scaled such that 100° C. corresponds to a 5 cm vertical distance and a 100 mm electrode length corresponds to a horizontal distance of 1 cm, and the K value is a ratio of a length of the temperature distribution curve to a length of a baseline.

3. In a process for producing a flux cored wire electrode, the improvement comprising selecting process conditions of said process so as to produce a flux cored wire electrode having a K value of 2.5 or less.

4. The process of claim 3, wherein the K value is 1.5 or less.

* * * * *